US011820263B2

(12) United States Patent
Trunzer et al.

(10) Patent No.: US 11,820,263 B2
(45) Date of Patent: Nov. 21, 2023

(54) CHILD SAFETY SEAT

(71) Applicant: Britax Römer Kindersicherheit GmbH, Leipheim (DE)

(72) Inventors: Karin Trunzer, Neu-Ulm (DE); Michael Schmitz, Ulm (DE); Simon Bayr, Offingen (DE)

(73) Assignee: Britax Römer Kindersicherheit GmbH, Leipheim (DE)

( * ) Notice: Subject to any disclaimer, the term of this patent is extended or adjusted under 35 U.S.C. 154(b) by 96 days.

(21) Appl. No.: 17/678,374

(22) Filed: Feb. 23, 2022

(65) Prior Publication Data

US 2022/0266728 A1    Aug. 25, 2022

(30) Foreign Application Priority Data

Feb. 24, 2021   (AU) ................... 2021201210

(51) Int. Cl.
    *B60N 2/28*         (2006.01)

(52) U.S. Cl.
    CPC .................... *B60N 2/2872* (2013.01)

(58) Field of Classification Search
    CPC ............................................... B60N 2/2872
    USPC ..................................... 297/216.11
    See application file for complete search history.

(56) References Cited

U.S. PATENT DOCUMENTS

| | | | |
|---|---|---|---|
| 9,610,868 B2 | 4/2017 | Zhang | |
| 10,118,510 B2 | 11/2018 | McRoberts et al. | |
| 2009/0152913 A1* | 6/2009 | Amesar | B60N 2/2881 297/216.11 |
| 2010/0194158 A1* | 8/2010 | Mahal | B60N 2/2821 297/216.11 |

FOREIGN PATENT DOCUMENTS

| | | |
|---|---|---|
| CN | 110641330 A | 1/2020 |
| CN | 211001013 U | 7/2020 |
| DE | 102016111608 B4 | 10/2018 |
| DE | 102015214910 B4 | 5/2019 |
| EP | 3006261 A1 | 4/2016 |
| EP | 2861455 B1 | 10/2017 |
| EP | 3284630 B1 | 5/2019 |
| EP | 3536549 A1 | 9/2019 |
| EP | 3564068 A1 | 11/2019 |
| EP | 3453565 B1 | 8/2020 |
| FR | 3026686 B1 | 7/2014 |
| WO | 2017029272 A1 | 2/2017 |
| WO | 2018109177 A1 | 6/2018 |

* cited by examiner

*Primary Examiner* — Anthony D Barfield
(74) *Attorney, Agent, or Firm* — K&L Gates LLP

(57) ABSTRACT

A child restraint for a vehicle, the child restraint comprising a body for supporting an occupant and at least one side impact element configured to be removably mounted with respect to the body in two configurations.

15 Claims, 5 Drawing Sheets

CHILD SAFETY SEAT

PRIORITY CLAIM

The present application claims priority to AU Patent Application No. 2021201210, filed Feb. 24, 2021, the entirety of which is herein incorporated by reference and relied upon.

TECHNICAL FIELD

The present invention relates to a child safety seat.

BACKGROUND

Child safety seats, including harnessed and non-harnessed, and forward facing and/or rearward facing variants, are configured to be installed within a vehicle and may be held in place by a vehicle seat belt or alternate connecting means, such as ISOFIX. It is a requirement that the outer geometry of a child restraint fit into various envelopes defined by regulatory organisations. The ability to install three restraints in a row is also an important factor for families with more than two children.

It is also known that child restraint performance during side impact events can be improved by an early contact between the child restraint and the intruding door. This is contradictive to the need for compact outer geometry, which in many cases, results in the child restraint being secured some distance from the intruding door.

Side impact devices configured to fold or extend in to the space between the child restraint and door are known, however such solutions carry complexity and cost, particularly with regard to stowing said devices and still providing inner dimensions suitable for accommodating larger occupants.

It is against this background that the present disclosure has been developed.

SUMMARY

According to a first aspect, there is provided a child restraint for a vehicle, the child restraint comprising a body for supporting an occupant, comprising a side impact element engaging portion; and at least one side impact element configured to be removably mounted with respect to the body in two configurations, the side impact element comprising first and second seat engaging portions configured to engage with the side impact element engaging portion, such that, when in a first configuration, the first seat engaging portion engages with the side impact element engaging portion, and when in a second configuration, the second seat engaging portion engages with the side impact element engaging portion.

In one form, when in the first configuration, the side impact element extends a first distance from the body of the child restraint, and in the second configuration, the side impact element extends a second, further distance from the body of the child restraint.

In one form, the first distance is approximately 20 to 60 mm.

In one form, the first distance is approximately 40 mm.

In one form, the second distance is greater than 40 mm.

In one form, the second distance is approximately 60 to 100 mm.

In one form, the second distance is approximately 80 mm.

In one form, the body comprises a pair of side extensions, extending forward of the child restraint, from a rear portion of the body, wherein each side extension comprises a side impact element engaging portion, to which a respective side impact element may engage.

In one form, the side impact element engaging portion is in the form of a pocket formed in the body, the pocket configured to slidably receive either of the seat engaging portions of the side impact element.

In one form, the seat engaging portions of the side impact element are in the form of attachment pins configured to slidably engage with the pocket formed in the body.

In one form, the side impact element engaging portion is in the form of an attachment pin formed in the body, the attachment pin configured to slidably engage with either of the seat engaging portions of the side impact element.

In one form, the seat engaging portions of the side impact element are in the form of pockets configured to slidably receive the attachment pin formed in the body.

In one form, the seat engaging portions of the side impact element are oriented at an angle of 60 to 120 degrees to each other.

In one form, the seat engaging portions of the side impact element are oriented at an angle of 90 degrees to each other.

In one form, the side impact element comprises a first impact surface positioned opposite to and spaced the first distance from the first seat engaging portion, and a second impact surface positioned opposite to and spaced the second, further distance from the second seat engaging portion.

BRIEF DESCRIPTION OF DRAWINGS

Embodiments of the present invention will be discussed with reference to the accompanying drawings wherein.

DESCRIPTION OF EMBODIMENTS

Figure 1:
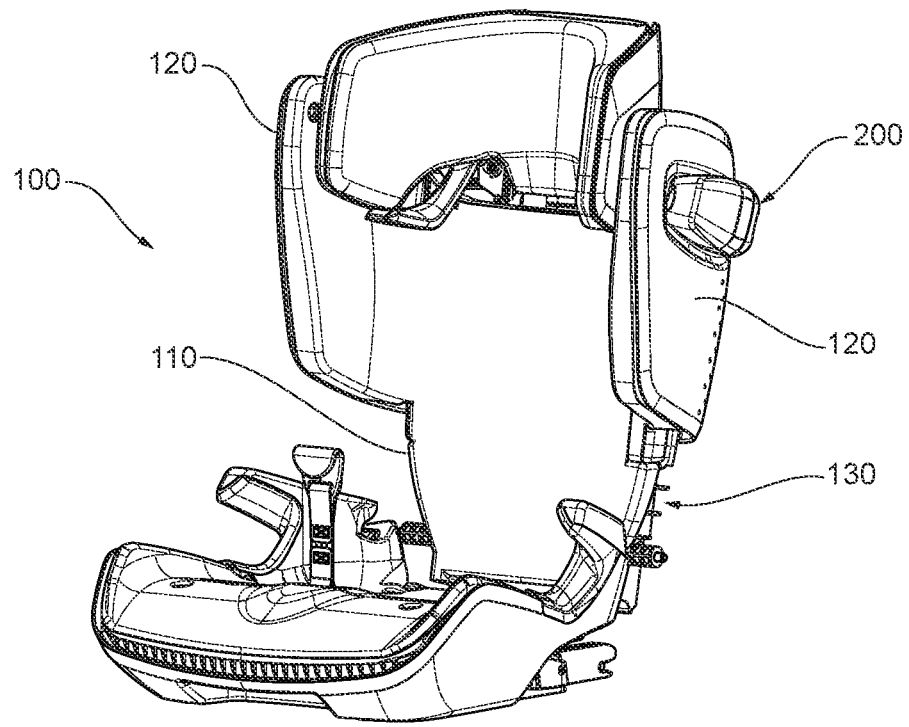
FIG. 1 is a front perspective view of a child restraint for a vehicle, according to an embodiment, comprising a side impact element in a first configuration.

Referring to FIGS. 1 to 8, there is shown a child restraint 100 for a vehicle. The child restraint 100 comprises a body 110 for supporting an occupant, and a side impact element 200 configured to be removably mounted with respect to the body 110 in two configurations.

The side impact element may be a rigid element so as to transfer side impact forces to the body of the child restraint, or alternatively the side impact element may be configured to controllably deform so as to absorb side impact forces.

It can be seen that the body 110 comprises a pair of side extensions 120, also known as side wings, that extend forward of the child restraint 100 from a rear portion 130 of the body 110, and as best shown in FIGS. 1 to 5, the side impact element 200 may be mounted to either of these side extensions 120 via a respective side impact element engaging portion 140.

Figure 5:
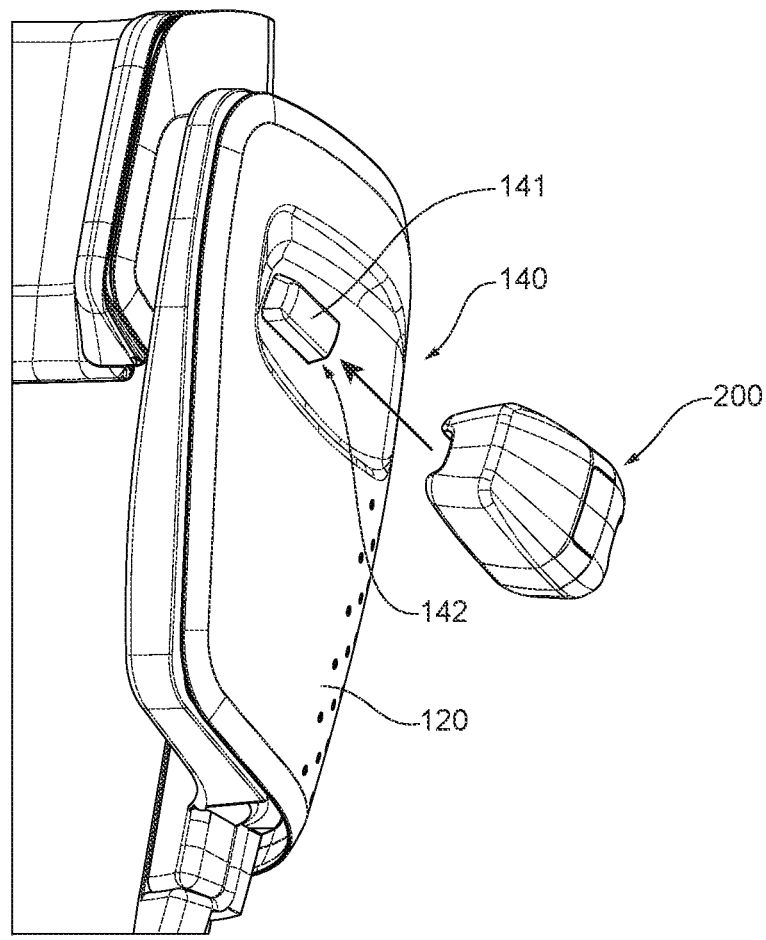
FIG. 5 is a detailed view of the child restraint of FIG. 1 detailing the relationship between side impact element and the seat shell.

As shown in FIG. 5, each side impact element engaging portion 140 is in the form of a pocket or recess 141 formed in the side extension 120 of the body 110, the pocket 141 configured to slidably receive either of two corresponding seat engaging portions 210, 220 on the side impact element 200.

Figure 2:
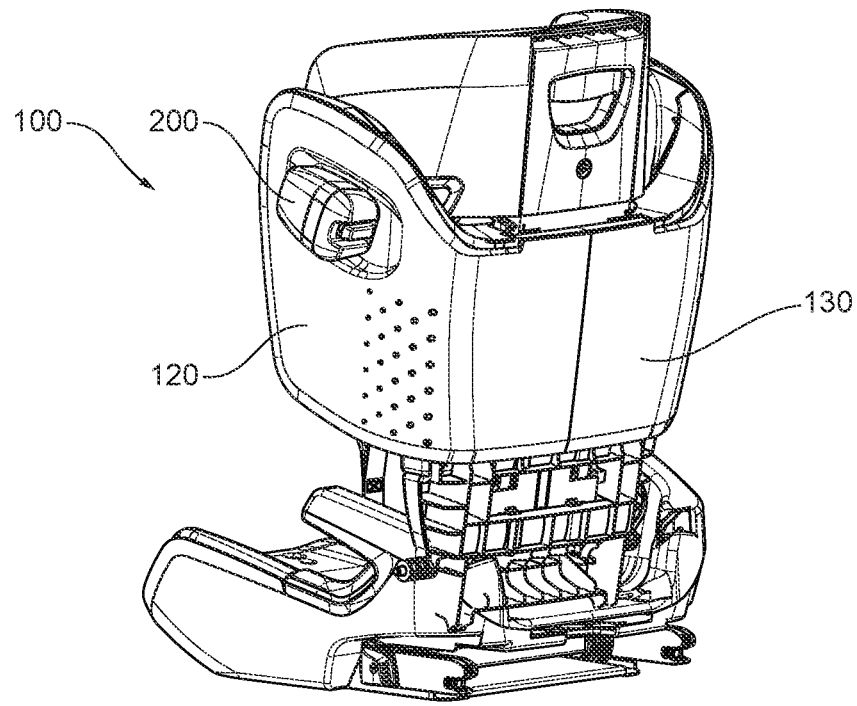
FIG. 2 is a rear perspective view of the child restraint of FIG. 1 comprising a side impact element in a first configuration.
Figure 3:
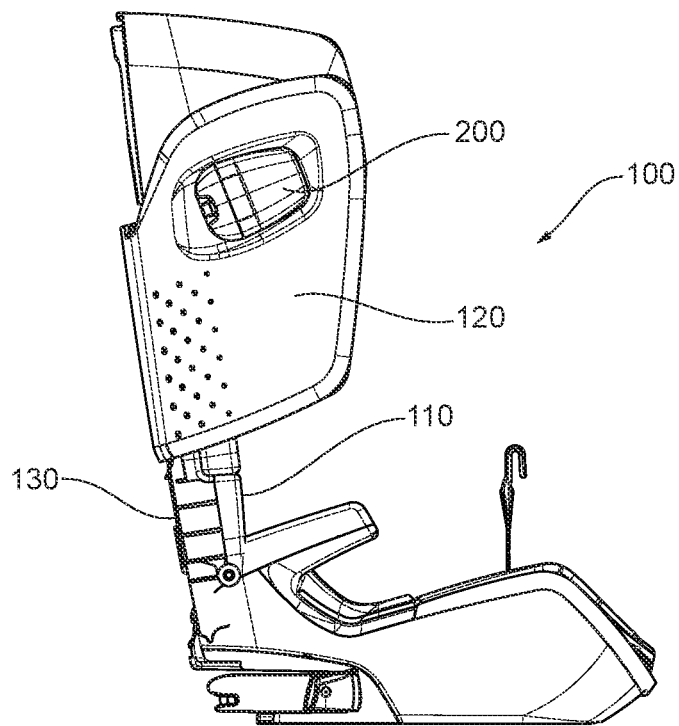
FIG. 3 is a side view of the child restraint of FIG. 1 comprising a side impact element in a first configuration.
Figure 4:
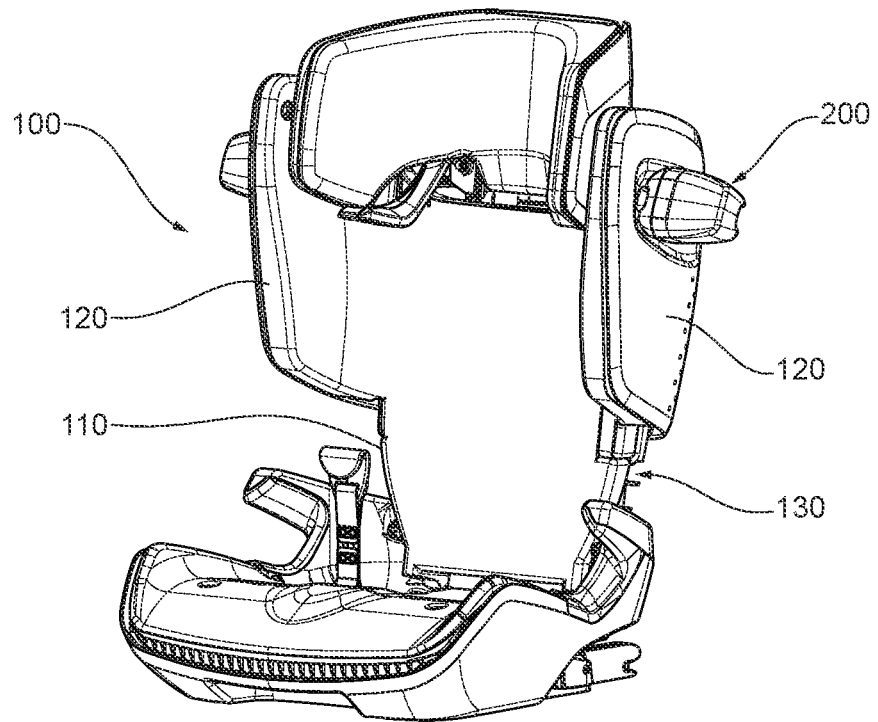
FIG. 4 is a front perspective view of the child restraint of FIG. 1, comprising a side impact element in a second configuration.
Figure 6:
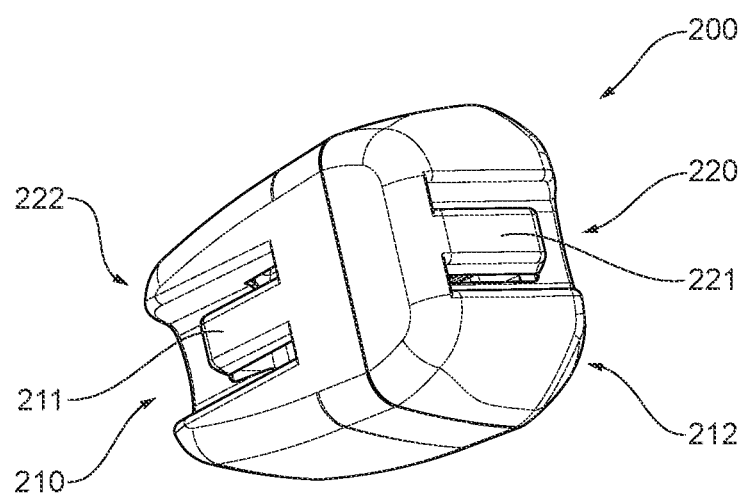
FIG. 6 is a perspective view of a side impact element, according to an embodiment.
Figure 7:
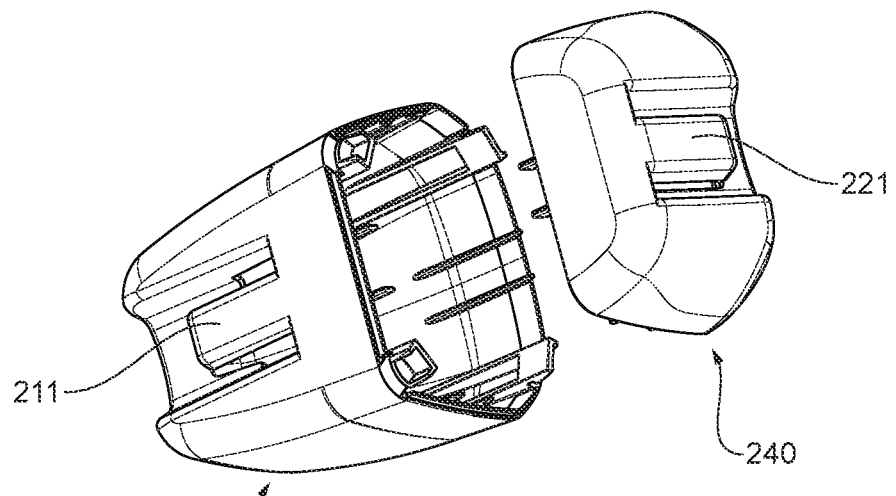
FIG. 7 is an exploded view of the side impact element of FIG. 6.

As best shown in FIGS. 6 and 7, the side impact element 200 features first and second seat engaging portions 210, 220 in the form of attachment pins 211, 221 which are configured to slidably engage with the pocket 141 formed in the body 110, such that, when in a first configuration (as shown in FIGS. 1 to 3) the first attachment pin 211 engages with the pocket 141, and when in a second configuration (as shown in FIG. 4) the second attachment pin 221 engages with the pocket 141.

It can be seen that the opening 142 of the pocket 141 faces toward the rear of the child restraint 100. It will be appreciated that arrangement requires the side impact element 200 to be inserted in a forward direction from the rear of the child restraint 100, and conversely removed in a rearward direction toward the rear of the child restraint 100. It will further be appreciated that this arrangement makes it difficult to change the configuration of the child restraint 100 and side impact element 200 once the child restraint 100 is installed in a vehicle, therefore reducing the likelihood of misuse or inadvertent removal. It will however be appreciated that the orientation of the pocket opening can vary such that the side impact element can be inserted and removed from any direction.

It can be seen that the attachment pins 211, 221 are oriented at an angle of 90 degrees to each other, and that the side impact 200 element further comprises a first impact surface 212 positioned opposite to and spaced a first distance of approximately 20 to 60 mm from the first attachment pin 211, and a second impact surface 222 positioned opposite to and spaced a second, further distance of greater than 40 mm from the second attachment pin 221. In a more preferred form, the first distance is around 40 mm and the second distance is 60 to 100 mm, preferably 80 mm.

It will be appreciated that when the side impact element 200 is mounted in the first configuration, the side impact element 200 extends a first distance from the body 110 of the child restraint 100 of around 40 mm (in the preferred form), and in the second configuration, the side impact element 200 extends a second, further distance from the body 110 of the child restraint 100 of around 80 mm (in the preferred form). It will be appreciated that the preferred first and second distances are one solution only and are the most preferred in this particular embodiment. It will further be appreciated that these distances may vary with alternative designs.

The pocket 141 may also feature a projection (not shown) or alternative means for presenting a "snap-in point" that an attachment pin 211, 221 passes before a stop position is reached. It will be appreciated that resistance to withdrawal provided by the projection is sufficient enough that the attachment pin 211, 221 and side impact element 200 will not work free under normal use, but is easily removed by a user in the event that the configuration of the child restraint 100 needs to be changed in response to a change in installation environment. In a further embodiment, the side impact element may be releasably secured with respect to the child restraint by a latch arrangement, where the side impact element is secured to the body of the child restraint by a latch, and released when a release button or the like is actuated.

It will be appreciated that depending on the size and/or the seating configuration of the vehicle, that the gap between the body 110 of the child restraint 100 and the adjacent door can vary and that the configuration of the child restraint 100 and side impact element 200 can be adjusted accordingly. It will be appreciated that by virtue of the symmetry of the side impact element 200, that the same side impact element can be installed on either side of the child restraint 100.

For some small vehicles and for some vehicles having the capability to accommodate three child restraints 100 in a row, the distance between child restraints 100 and the adjacent door is less than 80 mm. In such circumstances, the side extension 120 of the child restraint 100 closest to the door would be fitted with the side impact element 200 in its first configuration. For some larger vehicles and for vehicles only having to accommodate two child restraints 100 in a row, the distance is greater than 80 mm. In such circumstances, the side extension 120 of the child restraint 100 closest to the door would be fitted with the side impact element 200 in its second configuration.

Figure 8:
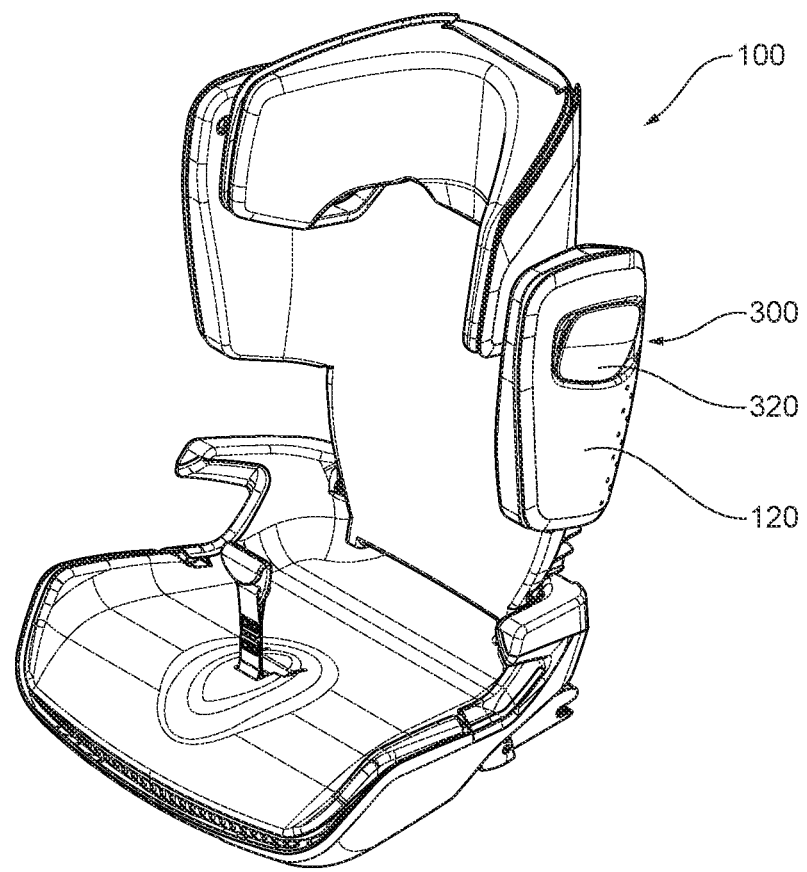
FIG. 8 is a front perspective view of the child restraint of FIG. 1 comprising a cover plate.
Figure 9:
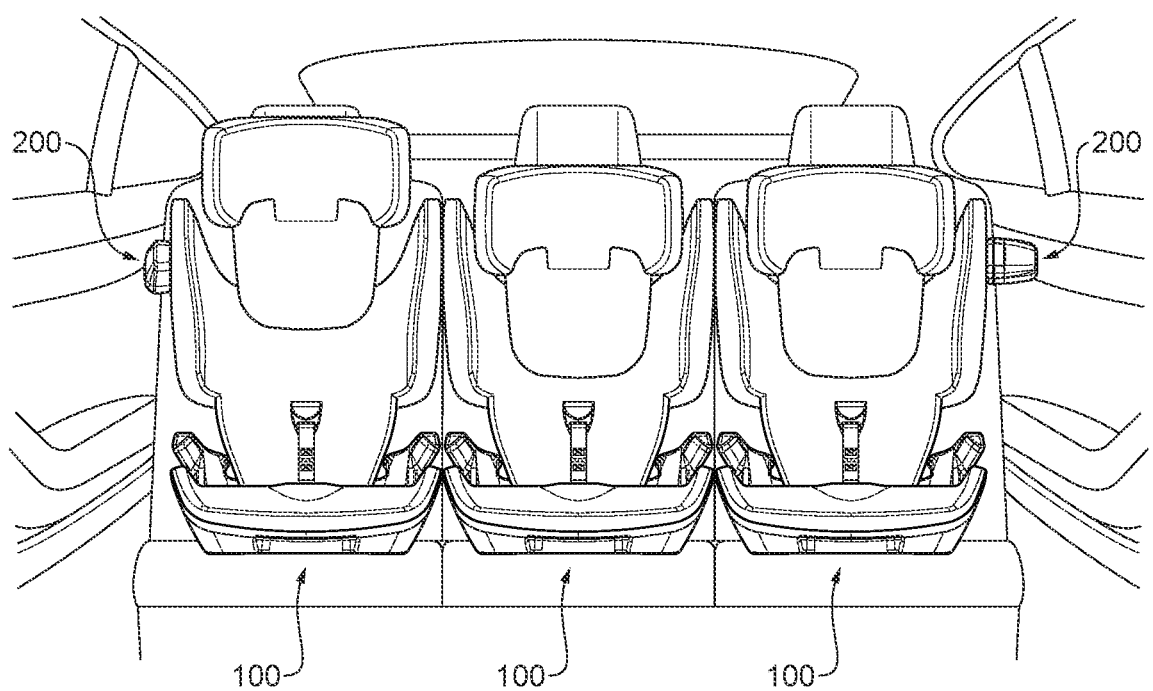
FIG. 9 is a perspective view of three child restraints installed in a row in a vehicle.

It will be appreciated that the non door facing side extension 120 does not require a side impact element 200, and, in circumstances where three child restraints 100 are installed in a row, as shown in FIG. 9, it would be unnecessary for the central child restraint 100 to be fitted with a side impact element 200. In such circumstances where a side impact element 200 is not installed, the vacant pocket(s) 141 of the child restraint 100 may be fitted with a cover plate 300 which also features an attachment pin (not shown) configured to engage with the pockets 141 provided in the body 110 of the child restraint 100, and a cosmetic cap 320 as best shown in FIG. 8.

While in the embodiment shown, the side impact element 200 and cover plate 300 engage with the body 110 of the child restraint via the pocket 141 and pin 211, 221 arrangement, it will be appreciated that alternative mounting arrangements allowing the side impact element 200 to engage with the child restraint 100 in two different configurations are also considered to fall within the scope of this disclosure. For example, in an alternate embodiment, the body of the child restraint may feature an attachment pin, and the side impact feature may feature a pair of pockets or slots. In a further embodiment, either of the body or the side impact element may feature one or more keyhole slots and the other features corresponding slot engaging pins. While in the embodiments shown and described, the side impact element is able to be attached to and removed from the body of the child restraint without the need for tools and/or fasteners, it will be appreciated that in a further embodiment, tools and/or fasteners may be used.

While in the embodiment shown, the attachment pins 211, 221 and the resultant impact surfaces 212, 222 are oriented at an angle of 90 degrees to each other, it will be appreciated that larger or smaller angles (ranging anywhere between 60 and 120 degrees) resulting in the provision of two configurations providing different distances between the body 110 of the child restraint 100 and respective impact surfaces 212, 222 are also considered to fall within the scope of this disclosure.

With reference to FIGS. 6 and 7, it can be seen that the side impact element 200 may be constructed from first and second polypropylene components 230, 240 manufactured using an injection moulding process. While in the embodiment shown the first and second components 230, 240 are clipped together, it will be appreciated that in alternative embodiments, the two components may be screwed, riveted, glued or ultrasonically welded. It will be appreciated that in further embodiments, alternative materials and manufacturing processes could be used. It will further be appreciated that in alternative embodiments, the side impact element may be constructed as a unitary component or more than two components.

It will be appreciated that by providing a removable side impact element 200 being capable of being mounted to the child restraint 100 in two different width configurations, that cost savings are also able to be recognised in comparison to a more complex folding or retracting solution.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A child restraint for a vehicle, the child restraint comprising:
   a body for supporting an occupant, comprising a side impact element engaging portion; and
   at least one side impact element configured to be removably mounted with respect to the body in two configurations, the side impact element comprising first and second seat engaging portions configured to engage with the side impact element engaging portion, such that, when in a first configuration, the first seat engaging portion engages with the side impact element engaging portion, and when in a second configuration, the second seat engaging portion engages with the side impact element engaging portion.

2. The child restraint of claim 1, wherein, when in the first configuration, the side impact element extends a first distance from the body of the child restraint, and in the second configuration, the side impact element extends a second, further distance from the body of the child restraint.

3. The child restraint of claim 2, wherein the first distance is approximately 20 to 60 mm.

4. The child restraint of claim 2, wherein the first distance is approximately 40 mm.

5. The child restraint of claim 2, wherein the second distance is greater than 40 mm.

6. The child restraint of claim 2, wherein the second distance is approximately 60 to 100 mm.

7. The child restraint of claim 2, wherein the second distance is approximately 80 mm.

8. The child restraint of claim 1, wherein the body comprises a pair of side extensions, extending forward of the child restraint, from a rear portion of the body, wherein each side extension comprises a side impact element engaging portion, to which a respective side impact element may engage.

9. The child restraint of claim 1, wherein the side impact element engaging portion is in the form of a pocket formed in the body, the pocket configured to slidably receive either of the seat engaging portions of the side impact element.

10. The child restraint of claim 9, wherein the seat engaging portions of the side impact element are in the form of attachment pins configured to slidably engage with the pocket formed in the body.

11. The child restraint of claim any claim 1, wherein the side impact element engaging portion is in the form of an attachment pin formed in the body, the attachment pin configured to slidably engage with either of the seat engaging portions of the side impact element.

12. The child restraint of claim 11, wherein the seat engaging portions of the side impact element are in the form of pockets configured to slidably receive the attachment pin formed in the body.

13. The child restraint of claim 1, wherein the seat engaging portions of the side impact element are oriented at an angle of 60 to 120 degrees to each other.

14. The child restraint of claim 1, wherein the seat engaging portions of the side impact element are oriented at an angle of 90 degrees to each other.

15. The child restraint of claim 1, wherein the side impact element comprises a first impact surface positioned opposite to and spaced the first distance from the first seat engaging portion, and a second impact surface positioned opposite to and spaced the second, further distance from the second seat engaging portion.

* * * * *